Aug. 3, 1926.

J. WAHL ET AL 1,594,763

PRESSURE GAUGE

Filed March 10, 1925

INVENTOR
John Wahl and
Otto Melzer
By Attorneys,
Fraser, Myers & Manley

Patented Aug. 3, 1926.

1,594,763

UNITED STATES PATENT OFFICE.

JOHN WAHL AND OTTO MELZER, OF BROOKLYN, NEW YORK, ASSIGNORS TO A. SCHRADER'S SON, INC., OF BROOKLYN, NEW YORK, A CORPORATION OF NEW YORK.

PRESSURE GAUGE.

Application filed March 10, 1925. Serial No. 14,371.

This invention relates to pressure gauges of the dial type and aims to provide certain improvements therein. More particularly, it relates to pressure gauges adapted for use in gauging pneumatic tire pressures, especially the lower pressures used in balloon tires.

Tire pressure gauges are usually subjected to rough and careless handling; hence, in order for such gauges to be practicable and efficient, they must be ruggedly constructed. The straight-line or pencil type of tire gauge, which comprises an elastic thimble, loading spring and an extensible element, has proven very satisfactory, whereas dial gauges, especially those of the Bourdon type, have not stood up so well.

According to the present invention, we provide in a dial gauge the gauge mechanism of the straight-line or pencil type of gauge, and the outward movement of the pressure responsive element is translated into a rotary movement of an indicator movable over a dial. Preferably, this conversion of rectilinear into curvilinear movement is carried out through the medium of a pivotal link connection between the extensible member of the gauge mechanism and the rotatable indicator. The invention also contemplates other features of novelty which will be hereinafter more fully described.

Figure 1:
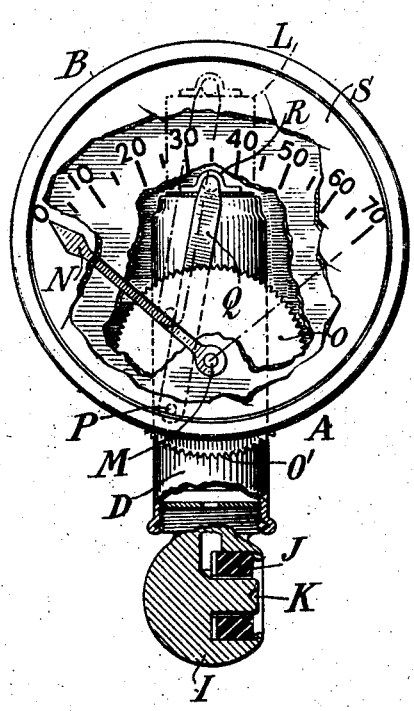

In the accompanying drawings wherein we have shown a preferred embodiment of our invention, Figure 1 is an elevation of the gauge, parts of which are broken away to show the interior structure thereof.

Figure 2:
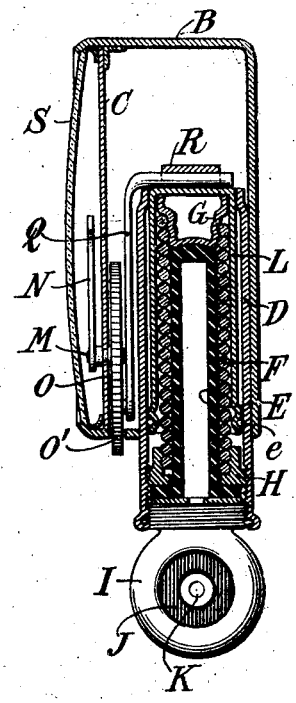

Fig. 2 is a diametrical section of the gauge shown in Fig. 1, taken at a right angle thereto, parts thereof being shown in elevation.

Referring to the drawings, let A indicate the pressure gauge as a whole which consists of a housing B, which is preferably cylindrical in form, one face of said housing being open, and as herein shown, is closed by a dial C, secured thereto in any known manner, and said housing has an opening in its side wall through which extends a casing D, which is secured to the housing by soldering, brazing or welding, or in any other preferred manner.

The casing D, which is preferably of cylindrical form, is the conventional casing of the straight-line or pencil type of gauge known as the "Schrader Universal" tire gauge, the pressure responsive elements of which comprise an elastic thimble E, and a loading spring F encircling said thimble, one end of said loading spring being secured to a plunger G, which seats against the top of the thimble E and the other end of which is anchored by a nut H to the casing D. Into the bottom of the casing D is secured a foot portion I, which is formed with a press-on seat J and valve-depressor K. This foot portion, it will be understood, may be of the conventional form or as herein shown, arranged with the press-on seat at a right angle to the axis of the casing. Extending into the top of the casing and surrounding the thimble, loading spring, and plunger is a slidable sleeve L, adapted to be moved outwardly of the casing. The sleeve L adjacent the lower end thereof, is provided with a split spring ring e, which frictionally engages the inner wall of the casing D, and is adapted to hold the sleeve L in its extended position after the thimble, loading spring, and plunger return to their normal position.

Fixedly mounted on a pin M, which extends through the dial C, is an indicator N, adapted for rotational movement over said dial, and at the rear of said dial, also fixedly mounted on said pin M, is a knurled wheel O, a portion of which extends through the casing, as shown at O' and adapted to be manually moved. Eccentrically pivoted to the wheel O, as indicated at P, is one end of a lever or link Q, the other end of which is pivoted to the top R of the extensible sleeve L. The link connection between the sleeve L and the wheel O is preferably such as to cause rotational movement of the wheel about its axis when the sleeve L is moved outwardy or inwardly and, conversely, rotation of the wheel O by the finger of an operator engaging the portion O', will function to move the sleeve L either inwardly or outwardly. For the purpose of preventing disfiguring of the dial and bending of the indicator N and for giving a more finished appearance to the gauge as a whole, the open face of the casing B above the dial C is provided with a crystal or an unbreakable transparent element S.

In the use of this gauge, the foot portion is pressed against the top of a tire valve, whereupon the compressed air from the tire entering the thimble E causes it to elongate, thereby moving the sleeve L outwardly. In the course of its outward movement, the sleeve L, through the medium of the link Q, rotates the wheel O, thereby moving the indicator N across the dial. Upon removal of the gauge from the tire valve, the plunger G, spring F, and thimble E return to their normal position, but due to the frictional engagement between the sleeve L and the casing D provided by the split spring e, the sleeve is retained in its extended position and with it the indicator N in its indicating position. This facilitates reading the gauge after its removal from the tire. For resetting the gauge, it is merely necessary to rotate the wheel O by engagement with the portion O' thereof. A gauge as thus described, it will be appreciated, is of sturdy construction and, because of the type of gauge mechanism employed, will prove very satisfactory in use.

While we have shown and described one embodiment of our invention, it is to be understood that the specific construction disclosed may be varied without departing from the spirit of the invention.

What we claim is:

1. A tire pressure gauge of the dial type comprising a housing, a pressure responsive member having a spring-pressed plunger, a rotatable indicator, means for transmitting the movement of the plunger to the rotatable indicator, said means comprising an element extending through the housing wall, means for retaining the indicator in indicating position, and means operable from the exterior of the housing and acting through the element which extends through the housing wall for resetting the indicator to its zero position.

2. A tire pressure gauge of the dial type comprising a housing, a casing extending within the housing, a pressure responsive member and a second member adapted to be moved by said pressure responsive member, in said casing, an element extending through the housing wall a rotatable indicator within the housing movable by said second member through the element which extends through the housing wall, means adapted to hold the indicator in indicating position after the pressure responsive member has returned to its normal position, a link connecting said second member with said element, and means operable from the exterior of the housing comprising the element which extends through the housing for resetting the indicator to its zero position and the second member to its normal position.

3. A tire pressure gauge of the dial type comprising a circular housing, open on one face and having an opening in its side, a casing having a major portion thereof extending into the side opening in the housing and secured thereto, and having therein a pressure responsive member, and a second member adapted to be moved by the pressure responsive member and telescope with the casing, a dial closing the open face of the housing, a pin extending through the dial, an indicator and a rotatable element mounted on said pin, and a link, one end of which is pivoted eccentrically to said rotatable element and the other end pivoted to the second member.

In witness whereof, we have hereunto signed our names.

JOHN WAHL.
OTTO MELZER.